United States Patent
Lee (10) Patent No.: US 9,882,680 B2
(45) Date of Patent: Jan. 30, 2018

(54) SURVEILLANCE SYSTEM INCLUDING NETWORK CAMERA AND GATEWAY AND METHOD OF DRIVING THE SAME

(71) Applicant: Hanwha Techwin Co., Ltd., Changwon-si (KR)

(72) Inventor: Joonsung Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 15/082,493

(22) Filed: Mar. 28, 2016

(65) Prior Publication Data

US 2016/0358434 A1  Dec. 8, 2016

(30) Foreign Application Priority Data

Jun. 5, 2015  (KR) .................. 10-2015-0080024

(51) Int. Cl.
 G08B 13/196 (2006.01)
 G08B 25/00 (2006.01)
 H04L 1/18 (2006.01)

(52) U.S. Cl.
 CPC .......... *H04L 1/18* (2013.01); *G08B 13/19656* (2013.01); *G08B 25/007* (2013.01); *G08B 13/19667* (2013.01); *G08B 13/19669* (2013.01)

(58) Field of Classification Search
 None
 See application file for complete search history.

(56) References Cited

U.S. PATENT DOCUMENTS

| | | | | |
|---|---|---|---|---|
| 5,966,385 A * | 10/1999 | Fujii | .................... | H04N 5/4401 348/423.1 |
| 2009/0119565 A1* | 5/2009 | Park | ...................... | H04L 1/1671 714/748 |
| 2013/0212440 A1* | 8/2013 | Rom | .................. | G06F 11/0709 714/47.1 |
| 2013/0223514 A1 | 8/2013 | Chono et al. | | |
| 2013/0322439 A1* | 12/2013 | Verhallen | .................. | H04J 3/12 370/389 |
| 2015/0016427 A1 | 1/2015 | Garudadri et al. | | |

FOREIGN PATENT DOCUMENTS

| | | |
|---|---|---|
| JP | 2013-179689 A | 9/2013 |
| KR | 10-2005-0058895 A | 6/2005 |
| KR | 10-2007-0013330 A | 1/2007 |
| KR | 10-2008-0050966 A | 6/2008 |

\* cited by examiner

*Primary Examiner* — Mark T Monk
(74) *Attorney, Agent, or Firm* — Sughrue Mion, PLLC (57) ABSTRACT

A surveillance system in which a network camera communicates with a client device via a gateway is provided. The network camera includes: at least one processor configured to implement a packet generator which generates a plurality of data packets, each including at least one of image data and audio data, and constitute a multi-data packet including the data packets; a memory configured to store at least a portion of the data packets; and an input/output interface through which the packet generator transmits the multi-data packet to a gateway or client device, wherein, in response to receiving an indication that a transmission error has occurred to at least one data packet among the data packets constituting the multi-data packet, the packet generator further generates a target data packet including the data packet from the stored data packets, and transmits the target data packet to the gateway or client device.

14 Claims, 9 Drawing Sheets

SURVEILLANCE SYSTEM INCLUDING NETWORK CAMERA AND GATEWAY AND METHOD OF DRIVING THE SAME

CROSS-REFERENCE TO THE RELATED APPLICATION

This application claims priority from Korean Patent Application No. 10-2015-0080024, filed on Jun. 5, 2015, in the Korean Intellectual Property Office, the disclosure of which is incorporated herein in its entirety by reference.

BACKGROUND

1. Field

Apparatuses and methods consistent with exemplary embodiments relate to a surveillance system and a method of driving the same, and more particularly, to a surveillance system and a method of driving the same, in which a network camera communicates with a client device via a gateway.

2. Description of the Related Art

In a surveillance system in which a network camera communicates with a client device via a gateway, when detecting an event, the network camera captures and compresses an image, and transmits a still image or a moving image of a compression result to the client device via the gateway. Since the network camera performing wireless communication uses power of a battery, it is important to reduce power consumption in order to extend the life of the battery.

SUMMARY

In a surveillance system, when a compression rate of an image transmitted from a network camera is high, an image transmission time shortens and a battery of the network camera endures longer, but the image quality of the image gets poor. In contrast, when the compression rate of the image is low, the image quality of the image is enhanced, but an image transmission time takes longer and the life of the battery shortens.

Exemplary embodiments of the inventive concept provide a surveillance system including a network camera and a gateway in which the network camera may reduce an image transmission time even without relatively increasing an image compression rate, and the battery life of the network camera may be relatively extended.

According to one or more exemplary embodiments, there is provided a network camera which may include: at least one processor configured to implement a packet generator which generates a plurality of data packets, each data packet including at least one of image data and audio data, and constitute a multi-data packet including the data packets; a memory configured to store at least a portion of the data packets; and an input/output interface through which the packet generator transmits the multi-data packet to a gateway or client device, wherein, in response to receiving an indication that a transmission error has occurred to at least one data packet among the data packets constituting the multi-data packet, the packet generator further generates a target data packet including the data packet from the stored data packets, and transmits the target data packet to the gateway or client device.

The packet generator may allocate an identifier (ID) to each of the data packets.

The packet generator may receive, from the gateway or the client device, an acknowledgment response including an ID of the data packet to which the transmission error has occurred, and generates the target data packet including the data packet by using the ID.

The acknowledgment response may indicate the ID of the data packet to which the transmission error has occurred by adding an error flag.

The client device or the gateway may set an operation condition of the network camera, and the operation condition may include at least one of a resolution of an image to be transmitted by the network camera, a condition of image compression performed by the network camera, a kind or type of the image to be transmitted by the network camera, and a transmission condition. The packet generator may differently constitute at least one of the data packets according to whether the operation condition is changed by the gateway or the client device.

In response to determining that the operation condition is not changed, the packet generator may generate the data packets such that each of the data packets includes a pocket for communication including length information of a corresponding data packet, and a payload not having a header, and in response to determining that the operation condition is changed, the packet generator may generate the data packets such that at least one of the data packets includes a payload having the header. The header may include information required to restore the at least one of the image data and the audio data.

The payload may include the at least one of the image data and the audio data which is compressed, and the header may include information about compressing the at least one of the image data and the audio data.

According to one or more exemplary embodiments, there is provided a surveillance system including the above network camera and the gateway. The gateway may be configured to check whether the transmission error has occurred to the data packet, transmit an ID of the data packet, to which the transmission error has occurred, to the I/O interface to control the packet generator to generate a target data packet including the data packet from the data packets for transmission to the gateway, and transmit an operation condition set by the client device or the gateway to the network camera to control the packet generator to differently constitute at least one of the data packets according to whether the operation condition is changed by the client device or the gateway.

In response to determining that the operation condition is not changed, the packet generator may generate the data packets such that each of the data packets includes a pocket for communication comprising length information of a corresponding data packet, and a payload not having a header, and in response to determining that the operation condition is changed, the packet generator may generate the data packets such that at least one of the data packets includes a payload having the header. The gateway may store the header and use the header for restoring the at least one of the image data or the audio data transmitted by the network camera.

The payload may include the at least one of the image data and the audio data which is compressed, and the header comprises information about compressing the at least one of the image data and the audio data.

In response to determining that the operation condition is not changed, the gateway may obtain a length of the payload not having the header by using the length information included in the pocket for communication, and obtain a length of the at least one of the image data or the audio data transmitted by the network camera by summing lengths of payloads not having the header, included in each of the data packets.

The gateway may be further configured to check the transmission error by using a cyclic redundancy check code of each of the data packets included in the multi-data packet.

According to one or more exemplary embodiments, there is provided a method of driving a network camera in a surveillance system. The method may include: generating, at the network camera, a plurality of data packets, each data packet including at least one of image data and audio data; constituting, at the network camera, a multi-data packet including the data packets; storing at least a portion of the data packets; transmitting the multi-data packet to a gateway or a client device; and in response to receiving an indication that a transmission error has occurred to at least one data packet among the data packets constituting the multi-data packet, generating a target data packet comprising the data packet from the stored data packets, and transmitting the target data packet to the gateway or the client device.

The method may further include allocating an ID to each of the data packets.

The method may further include receiving, at the network camera, from the gateway or the client device, an acknowledgment response comprising an ID of the data packet to which the transmission error has occurred, to perform the generating the target data packet including the data packet by using the ID.

The acknowledgment response may indicate the ID of the data packet to which the transmission error has occurred by adding an error flag.

The method may further include setting, at the gateway or the client device, an operation condition of the network camera and transmitting the operation condition to the network camera. The generating the data packets may include differently constituting at least one of the data packets according to whether the operation condition is changed by the gateway or the client device.

The generating of the data packets may include, in response to determining that the operation condition is not changed, generating the data packets such that each of the data packets includes a pocket for communication comprising length information of a corresponding data packet, and a payload not having a header. The header may include information required to restore the at least one of the image data and the audio data.

The payload may include the at least one of the image data and the audio data which is compressed, and the header comprises information about compressing the at least one of the image data and the audio data.

The generating the data packets may include, in response to determining that the operation condition is changed, generating the data packets such that at least one of the data packets includes a payload having the header which includes information required to restore the at least one of the image data and the audio data at the client device or the gateway.

According to the exemplary embodiments, since the network camera may reduce an image transmission time even without increasing a compression rate of an image, life of a battery that supplies power to the network camera may be extended.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

As the inventive concept allows for various changes and numerous embodiments, exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description of the inventive concept, certain detailed explanations of the related art are omitted when it is deemed that they may unnecessarily obscure the essence of the inventive concept.

Hereinafter, exemplary embodiments are described in detail with reference to the accompanying drawings. Like reference numerals are used for like or corresponding elements when description is made with reference to the drawings, and repeated description thereof is omitted.

Hereinafter, exemplary embodiments are described in detail with reference to the drawings.

Figure 1A:
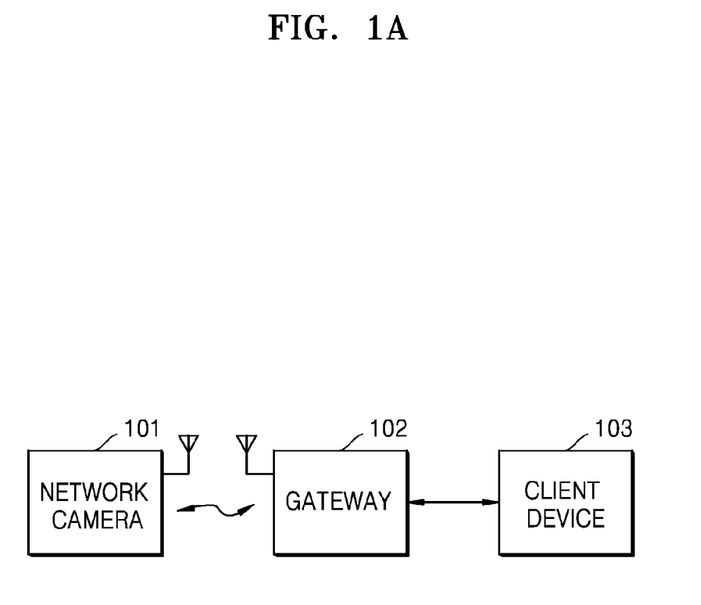
FIGS. 1A and 1B illustrate a surveillance system and a network camera constituting the surveillance system, according to exemplary embodiments.
Figure 1B:
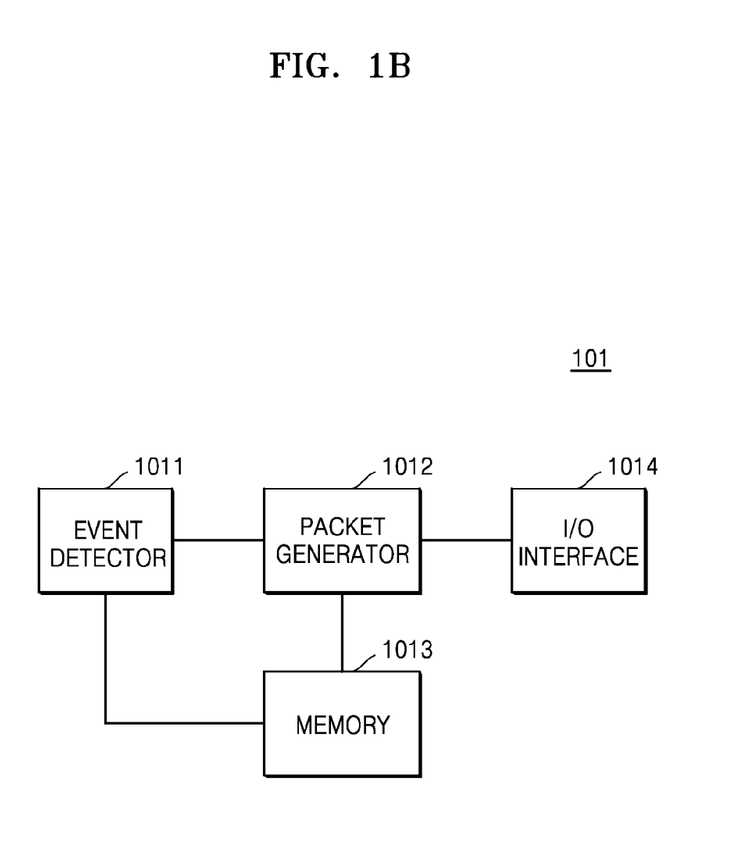

FIG. 1A is a configuration view illustrating a surveillance system, according to an exemplary embodiment, and FIG. 1B illustrates a block diagram of a network camera included in the surveillance system of FIG. 1A, according to an exemplary embodiment.

To prevent characteristics of the present exemplary embodiment from being obscured, FIGS. 1A and 1B illustrate only components related to the present exemplary embodiment. Therefore, those of ordinary skill in the art will understand that other general components may be further included besides the components illustrated in FIGS. 1A and 1B.

Referring to FIG. 1A, the surveillance system according to an exemplary embodiment includes a network camera 101, a gateway 102, and a client device 103. Referring to FIG. 1B, the network camera 101 includes an event detector 1011, a packet generator 1012, a memory 1013 and an input/output (I/O) interface 1014.

Here, the packet generator 1012 may be embodied as various numbers of hardware, software and/or firmware structures that execute respective functions described above, according to an exemplary embodiment. For example, the packet generator 1012 may use a direct circuit structure, such as a memory, processing, logic, a look-up table, etc. that may execute the respective functions through controls of one or more microprocessors or other control apparatuses. Also, the packet generator 1012 may be specifically embodied by a module, a program, or a part of code, which contains one or more executable instructions for performing specified logic functions, and executed by one or more microprocessors or other control apparatuses. The packet generator 1012 may further include a processor such as a central processing unit (CPU) that performs the respective functions, a microprocessor, or the like. The I/O interface 1014 through which various signals are input and output may be implemented by a hardware with or without software such as an I/O port as well known in the ordinary skill in the art.

The network camera 101 communicates with the client device 103 via the gateway 102. When detects an event at the event detector 1011, the network camera 101 captures and compresses an image, and transmits a compressed still image or moving image to the gateway 102 through the I/O interface 1014 so that the gateway 102 relays the compressed still image or moving image to the client device 103.

The I/O interface 1014 may communicate with the gateway 102 by using an Internet protocol (IP). For example, the I/O interface may communicate with the gateway 102 by using a multi-protocol having a band of about 2.4 GHz.

The network camera 101 may be a pan-tilt-zoom (PTZ) camera that may perform panning and tilting and adjust a zoom magnification of a lens. Though FIG. 1A illustrates one network camera 101, this is for convenience of description, and a surveillance system according to another exemplary embodiment may include a plurality of network cameras.

According to an exemplary embodiment, the packet generator 1012 generates a plurality of data packets, constitutes a multi-data packet including the data packets, and transmits the multi-data packet including the data packets to the gateway 102 through the I/O interface 1014. Also, the packet generator 1012 may generate or extract, from the data packets, a target data packet comprising at least one data packet where a transmission error has occurred among the data packets constituting the multi-data packet, as will be described later. Here, the data packets forming the multi-data packet may be stored in the memory 1013 so that the packet generator 1012 may generate or extract the target data packet from the data packets stored in the memory 1013.

The client device 103 may control an operation of the network camera 101 according to a driving method of a surveillance system according to exemplary embodiments. The client device 103 may be driven in the form included in another hardware device such as a microprocessor or a general computer system. According to an exemplary embodiment, the client device 103 may be a smartphone, a notebook computer, a tablet, etc., not being limited thereto.

Figure 2:
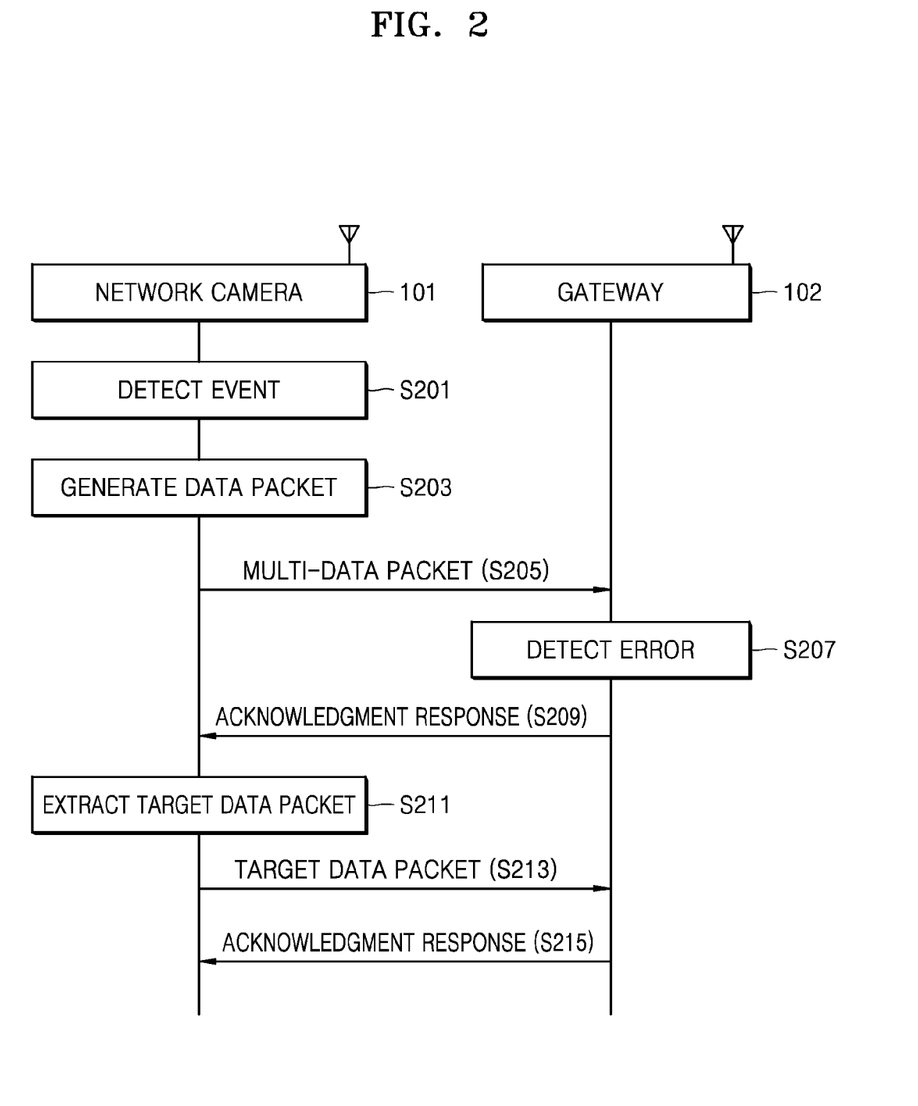
FIG. 2 is a flowchart for explaining a method of driving a surveillance system, according to an exemplary embodiment.

FIG. 2 is a flowchart for explaining a method of driving a surveillance system, according to an exemplary embodiment.

Referring to FIG. 2, when detecting an event (S201) by the event detector 1011, the packet generator 1012 generates a plurality of data packets (S203).

The event detector 1011 may detect the event by using a sensor such as an image sensor, an infrared sensor, an audio sensor, etc. included in the event detector 1011. The event may denote a motion of a target inside a detection region detected by the image sensor or the infrared sensor. The event may denote voice, screaming, a sound having a predetermined frequency, etc. detected by the audio sensor.

The event detector 1011 may detect one or more events for a predetermined time period, and generate one or more data packets corresponding to the one or more events. For example, the event detector 1011 may detect a plurality of events for the predetermined time, and the packet generator 1012 may generate a plurality of data packets respectively corresponding to the plurality of events.

The packet generator 1012 may allocate an identifier (ID) or identification number to each of the data packets. For example, the packet generator 1012 may record an ID representing a sequence in which an event corresponding to a relevant data packet has been detected, on a head of each of the data packets which will be described later. Here, the head of each of the data packets is different from a header to be described later.

Subsequently, the packet generator 1012 constitutes a multi-data packet including the data packets, and transmits the multi-data packet to the gateway 102 through the I/O interface 1014 (S205).

Here, each of the data packets may include a pocket for communication and a payload. The pocket for communication may include length information of a corresponding data packet. The payload may have a header or may not have a header. According to an exemplary embodiment, in the case where an operation condition of the network camera 101, which will be described later, is not newly set (i.e., not changed), each of the data packets may include a pocket for communication including length information of a corresponding data packet and a payload not having a header. In the case where an operation condition of the network camera 101, which will be described later, is newly set (i.e., changed), one of the data packets may include a payload having a header.

The gateway 102 checks a transmission error of each of the data packets included in the multi-data packet (S207). According to an exemplary embodiment, the gateway 102 may check the transmission error by using a cyclic redundancy check (CRC) code of each of the data packets.

Subsequently, the gateway 102 transmits an acknowledgment response to the network camera 101 in response to the multi-data packet (S209). According to an exemplary embodiment, the acknowledgment response may include an ID of at least one data packet where a transmission error has occurred. Here, the acknowledgment response may indicate the ID of the data packet where the transmission error has occurred by using an error flag. The acknowledgment response may be a signal requesting retransmission of the data packet where the transmission error has occurred.

The packet generator 1012 may generate or extract a target data packet from the data packets constituting the multi-data packet in response to the acknowledgment response from the gateway 102 (S211). In order to generate or extract the target data object from the data packets which have already been transmitted to the gateway 102, the packet generator 1012, after transmitting the multi-data packet to the gateway 102 through the I/O interface 1014, may store the data packets in the memory 1013 at least for a given time period. According to an exemplary embodiment, the target data packet may include the data packet where the transmission error has occurred.

When the packet generator 1012 transmits the target data packet to the gateway 102 through the I/O interface 1014 (S213), the gateway 102 transmits an acknowledgment response to the network camera 101 in response to the target data packet (S215).

Figure 3:
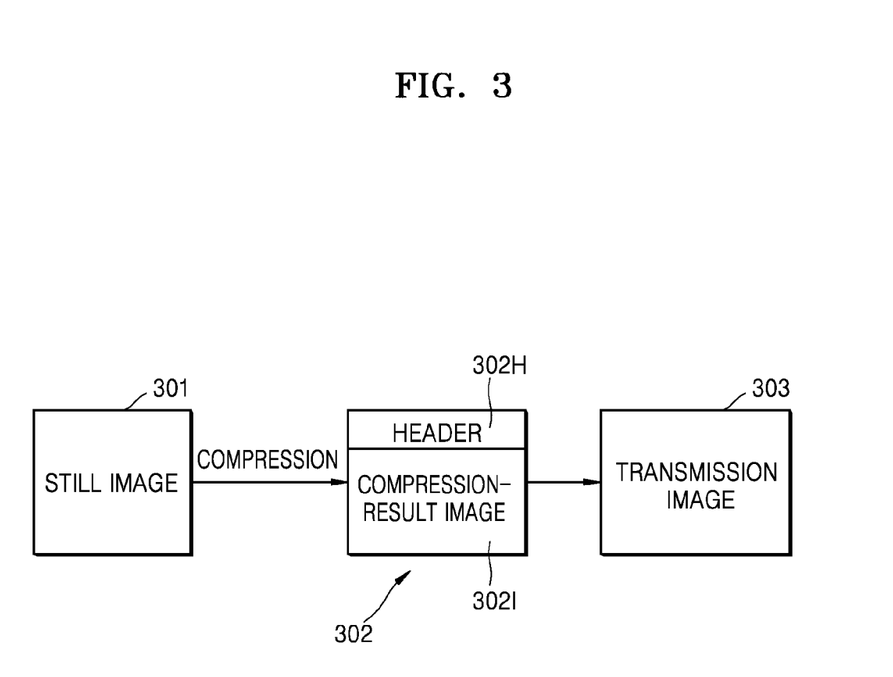
FIG. 3 is a block diagram for explaining a transmission target image, according to an exemplary embodiment.

FIG. 3 is a block diagram for explaining a transmission target image, according to an exemplary embodiment.

Referring to FIG. 3, the packet generator 1012 of the network camera 101 generates an image compression result 302 by compressing a still image 301 captured when an event is detected. The image compression result 302 includes a header 302H and compression-result image data 3021. Compression information regarding the compression-result image data 3021 may be described on the header 302H. Here, the still image 301 may be replaced by a moving image.

Depending on a case, a transmission image 303 may or may not have the header 302H. According to an exemplary embodiment, in the case where an operation condition of the network camera 101, which will be described later, is not newly set, a multi-data packet for the transmission target image 303 that does not have the header 302H may be generated. According to another exemplary embodiment, in the case where an operation condition of the network camera 101, which will be described later, is newly set, the header 302H may exist in the transmission target image 303 while a multi-data packet is generated.

Figure 4:
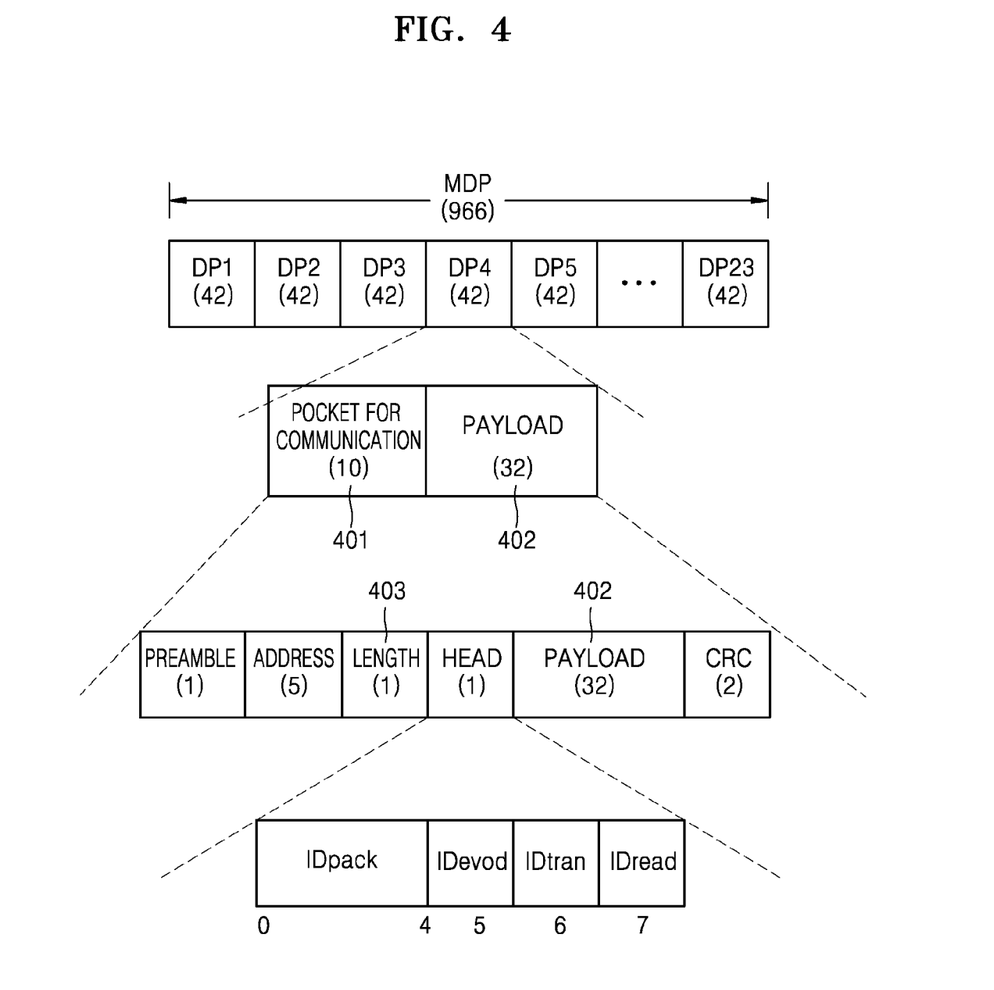
FIG. 4 is a diagram for explaining a multi-data packet, according to an exemplary embodiment.

FIG. 4 is a diagram for explaining a multi-data packet MDP, according to an exemplary embodiment.

Referring to FIGS. 3 and 4, the multi-data packet MDP may include, for example, a plurality of data packets, e.g., 23 data packets DP1 to DP23. Since the multi-data packet MDP is transmitted to the gateway 102, an acknowledgment response reception procedure from the gateway 102 may be reduced remarkably, and thus an image transmission time may be reduced.

According to an exemplary embodiment, each of the data packets DP1 to DP23 may have 42 bytes, and include a pocket for communication 401 having 10 bytes, and a payload 402 having 32 bytes. The payload 402 may not have the header 302H.

The compression-result image data 3021 generated by the network camera 101 or a portion of the transmission target image 303 may be described on the payload 402 that does not have the header 302H. Compression information included in the header 302H may change only when an operation condition of the network camera 101, which will be described later, is newly set.

The pocket for communication 401 includes a 1-byte preamble, a 5-byte address, 1-byte length information 403, a 1-byte head, and a 2-byte CRC code.

The head may include information indicating a kind or type of a data packet. For example, the head may include a 5-bit data packet ID IDpack, a 1-bit even-numbered-odd-numbered information ID IDevod, a 1-bit data existence information ID IDtran, and a 1-bit response request ID IDreac. The even-numbered-odd-numbered information ID IDevod may be information for a transaction process. The data existence information ID IDtran may indicate whether real data exists on the 32-byte payload. The response request ID IDreac may indicate whether the gateway 102 should respond.

According to an exemplary embodiment, the gateway 102 or the client device 103 may calculate the length of the payload 402 based on the length information 403 included in the pocket for communication 401. That is, the gateway 102 or the client device 103 may obtain the length of the payload 402 that does not have the header 302H by using the length information 403 included in the pocket for communication 401, and obtain the length of the compression-result image data 3021 by summing up the lengths of payloads 402 not having the header 302H, and respectively included in the data packets DP1 to DP23.

A surveillance system according to an exemplary embodiment may reduce the amount of image transmission even without increasing a compression rate of an image, and thus, reduce an image transmission time by transmitting the data packets DP1 to DP23 including the payload 402 not having the header 302H depending on a case.

For example, it is assumed that a still image 301 of FIG. 3 is a video graphics array (VGA), a 1 frame of the VGA has 15 k bytes (kilo bytes), the compression-result image data 3021 has 7,360 bytes, the header 302H has 8 bytes, and the network camera 101 transmits a VGA of 100 frames in total.

In the case of transmitting the series of data packets DP1 to DP23 including the payload 402 having the header 302H, the amount of first image transmission is calculated by Equation 1.

$$(7{,}360+8) \times 100 = (7{,}368) \times 100 = 736{,}800 \tag{1}$$

The amount of the first image transmission is 736,800 bytes, that is, 5,894,400 bits. When a wireless data transmission rate is 1,024,000 bps (bits per second), an image transmission time becomes 5,756.25 ms (millisecond).

In the case of transmitting the data packets DP1 to DP23 including the payload 402 not having the header 302H, the amount of second image transmission is calculated by Equation 2

$$7{,}360 \times 100 = 736{,}000 \tag{2}$$

The amount of the second image transmission is 736,000 bytes, that is, 5,888,000 bits. When a wireless data transmission rate is 1,024,000 bps (bits per second), an image transmission time becomes 5,750 ms.

Therefore, in the case of transmitting the data packets DP1 to DP23 including the payload 402 not having the header 302H, the amount of image transmission is reduced by about 6.4 kbits, and an image transmission time is reduced by about 6.25 ms.

Figure 5:
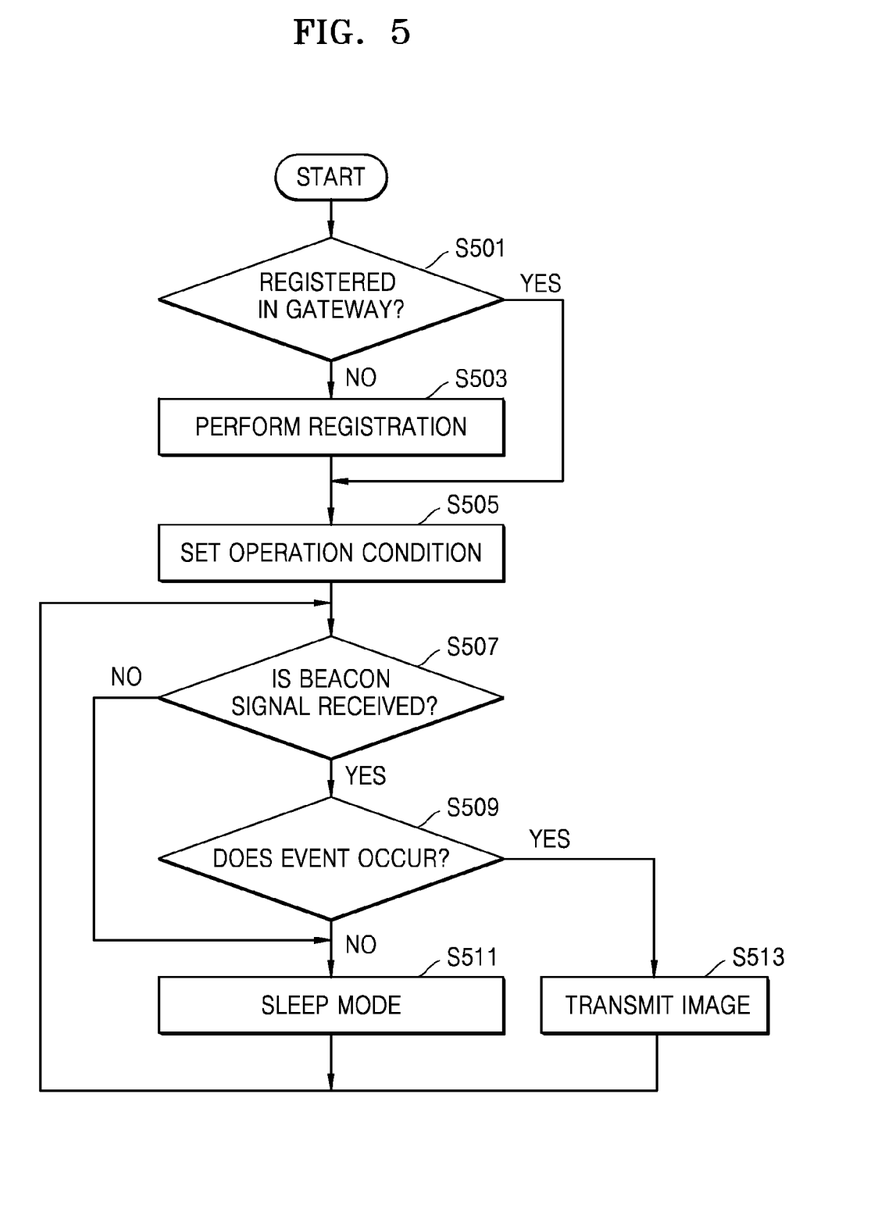
FIG. 5 is a flowchart for explaining a method of driving a network camera, according to an exemplary embodiment.

FIG. 5 is a flowchart for explaining a method of driving a network camera, according to an exemplary embodiment.

Referring to FIG. 5, when battery power is applied, the network camera 101 determines whether the network camera 101 is registered in the gateway 102 (S501). When the network camera 101 is not registered in the gateway 102, the network camera 101 performs registration in the gateway 102 (S503).

Subsequently, an operation condition of the network camera 101 is set by the client device 103 via the gateway 102 (S505). Operation S505 is described below with reference to FIG. 6.

Figure 6:
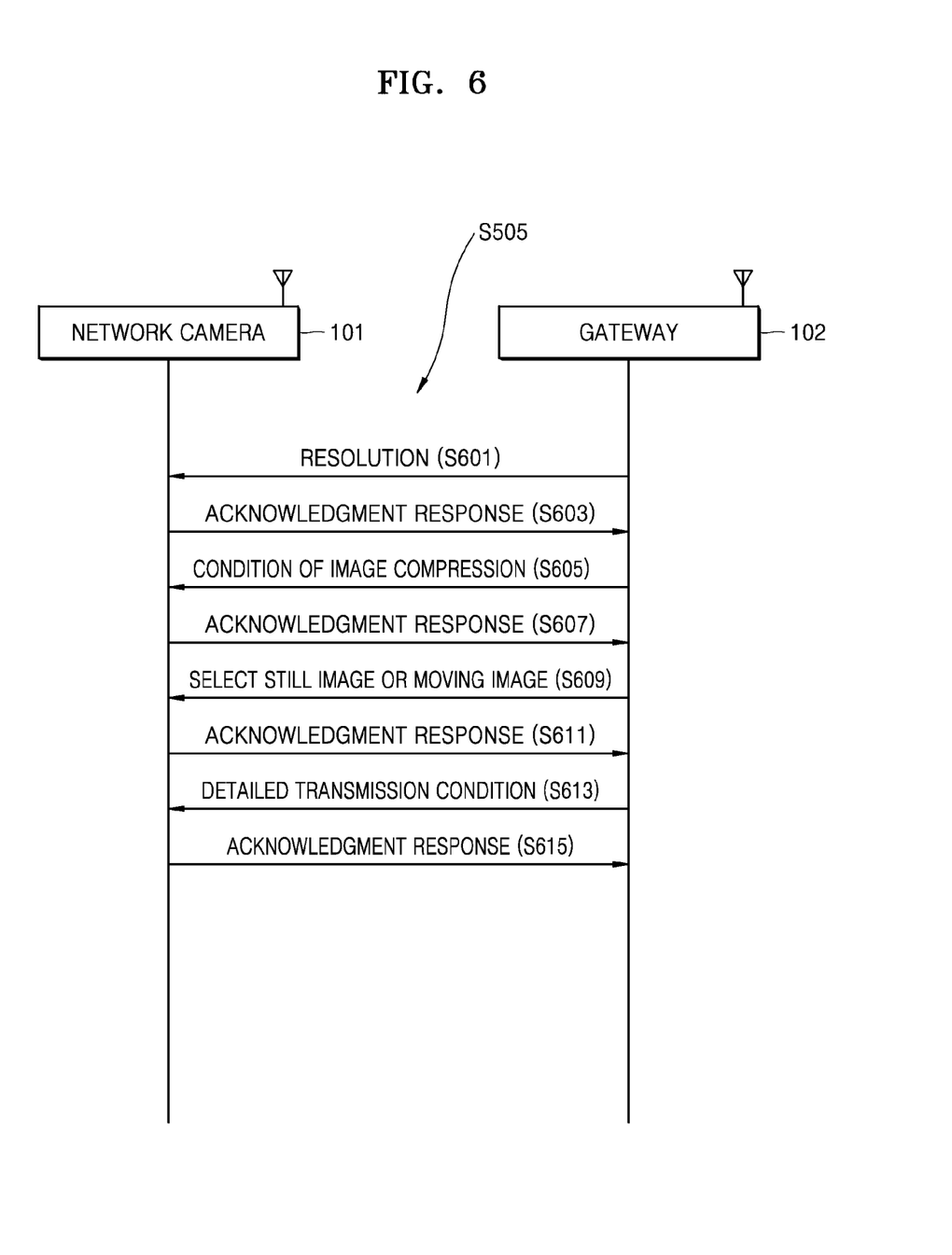
FIG. 6 is a flowchart for explaining operation S505 of FIG. 5 in detail, according to an exemplary embodiment.

FIG. 6 is a flowchart for explaining operation S505 of FIG. 5 in detail.

Referring to FIG. 6, the gateway 102 transmits, to the I/O interface 1014 of the network camera 101, information about a resolution of an image to be transmitted by the network camera 101 to the gateway 102 (S601). In response, the network camera 101 transmits an acknowledgment response signal to the gateway 102 (S603).

The gateway 102 transmits condition information of image compression to be performed by the network camera 101 to the network camera 101 (S605). In response, the network camera 101 transmits an acknowledgment response signal to the gateway 102 (S607).

The gateway 102 transmits information about a type or kind of an image to be transmitted by the network camera 101, for example, selection information of a still image or a moving image to the network camera 101 (S609). In response, the network camera 101 transmits an acknowledgment response signal to the gateway 102 (S611).

The gateway 102 transmits detailed transmission condition information of the network camera 101 to the network camera 101 (S613). The detailed transmission condition includes a communication condition of the gateway 102 and the network camera 101. In response, the network camera 101 transmits an acknowledgment response signal to the gateway 102 (S615).

Referring to FIG. 5 again, the network camera 101 determines whether a beacon signal is received from the gateway 102 (S507). When a beacon signal is received from the gateway 102, the network camera 101 determines whether an event occurs (S509).

When an event occurs, the network camera 101 transmits an image corresponding to the event to the gateway 102 (S513), and then determines whether a beacon signal is received (S507). Operation S513 is described below with reference to FIG. 7.

Figure 7:
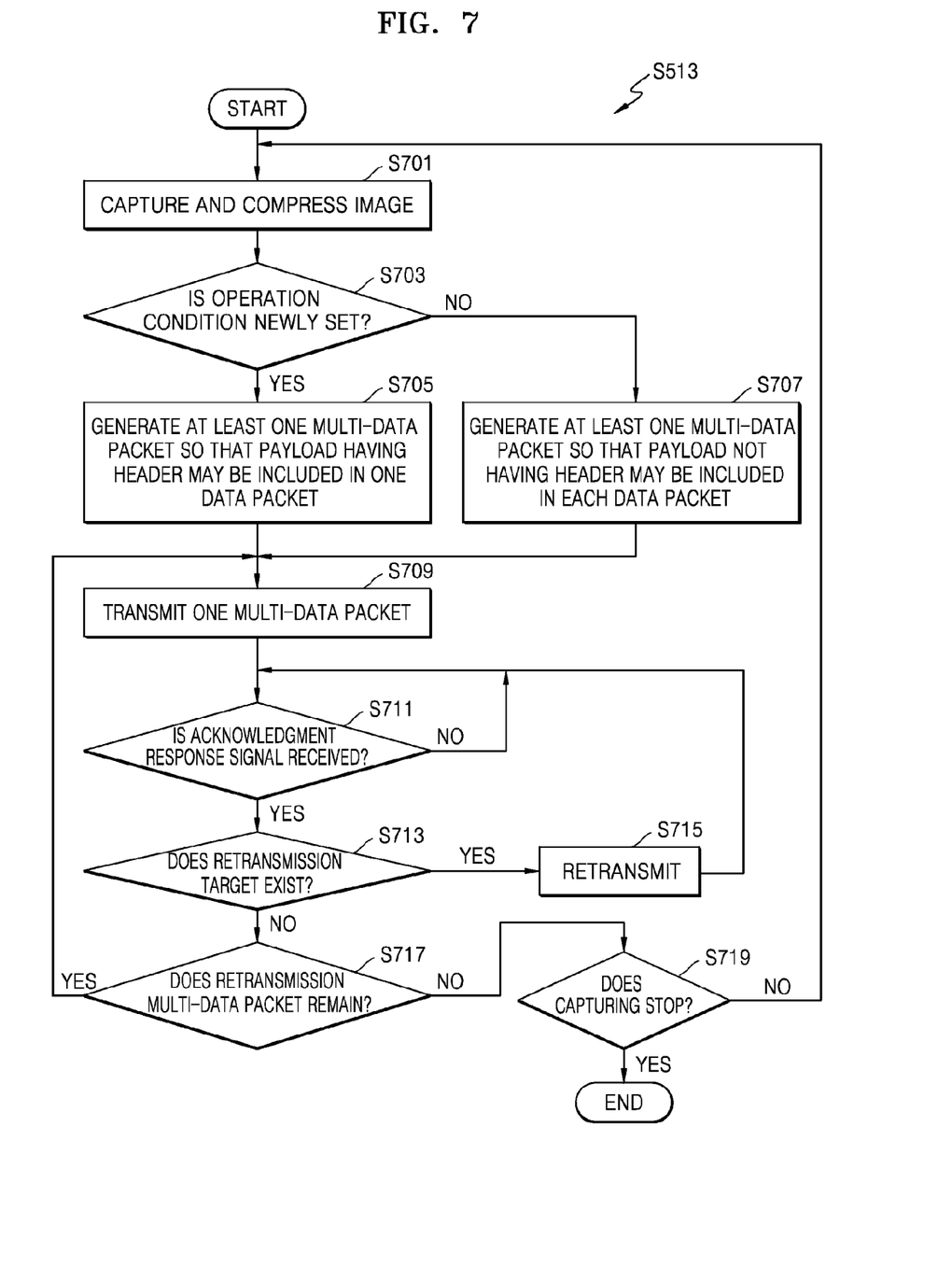
FIG. 7 is a flowchart for explaining operation S513 of FIG. 5 in detail, according to an exemplary embodiment.

FIG. 7 is a flowchart for explaining operation S513 of FIG. 5 in detail.

Referring to FIGS. 4 and 7, when an event is detected, the network camera 101 captures and compresses an image corresponding to the event (S701). Here, the image corresponding to the event may include at least one of an image pre-recorded for a predetermined time immediately before the event occurs, an image at the time of the event occurs, and an image recorded for a predetermined time immediately after the event occurs.

Subsequently, the network camera 101 determines (e.g., through the packet generator 1012) whether an operation condition of the network camera 101 is newly set (S703).

In the case where the operation condition of the network camera 101 is newly set, the network camera 101 generates at least one multi-data packet MDP including the payload 402 having the header 302H in at least one data packet, for example, a first data packet DP1 (S705). After that, the gateway 102 or the client device 103 may store the header 302H included in the payload 402, and use the header 302H when restoring the compression-result image data 3021.

In the case where the operation condition of the network camera 101 is not newly set, the network camera 101 generates at least one multi-data packet MDP including the payload 402 without the header 302H in each data packet (S707).

Subsequently, the network camera 101 transmits one multi-data packet MDP to the gateway 102 (S709).

Next, when an acknowledgment response signal is received from the gateway 102 (S711), the network camera 101 determines whether a target data packet for retransmission exists (S713). An acknowledgment response signal is described below with reference to FIG. 8.

Figure 8:
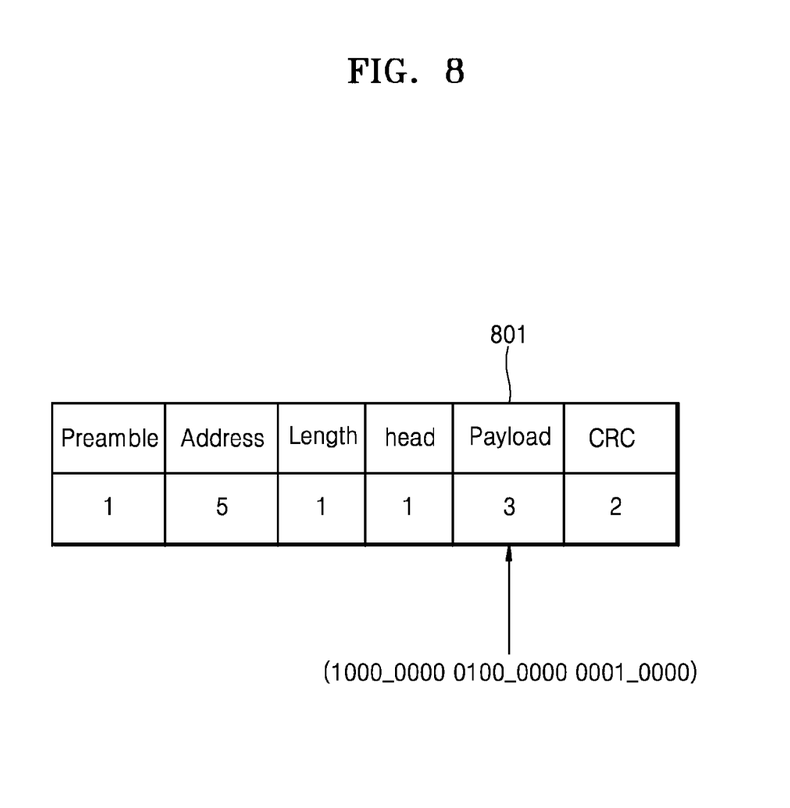
FIG. 8 is a diagram for explaining an acknowledgment response, according to an exemplary embodiment.

FIG. 8 is a diagram for explaining an acknowledgment response, according to an exemplary embodiment.

Referring to FIGS. 4 and 8, the acknowledgment response may include a payload 801 indicating a data packet where a transmission error has been detected by using an error flag.

For example, in the case where transmission errors for a first data packet DP1, a tenth data packet DP10, and a twentieth data packet DP 20 have occurred among a multi-data packet MDP received from the network camera 101, the gateway 102 may request retransmission of the first data packet DP1, the tenth data packet DP10, and the twentieth data packet DP 20 by transmitting an acknowledgment response including an error flag having a bit string of 1000_0000 0100_0000 0001_0000.

Referring to FIG. 7 again, in the case where a retransmission target data packet exists, the network camera 101 (specifically, the packet generator 1012) retransmits the target data packet to the gateway 102 through the I/O interface 1014 (S715).

Operations S709 to S715 are repeatedly performed until a multi-data packet MDP to transmit does not remain, that is, until all of at least one multi-data packet is transmitted (S717).

Operations S701 to S717 are repeatedly performed until image capturing by the network camera 101 stops (S719).

Referring to FIG. 5 again, in the case where an event does not occur, the network camera 101 performs a sleep mode (S511), and determines whether a beacon signal is received (S507).

As described above, the compression information for the compression-result image data 3021 may be described on the header 302H. The compression information may change when an operation condition of the network camera 101 is newly set.

In the case where an operation condition of the network camera 101 is not newly set, the gateway 102 or the client device 103 may calculate the length of the payload 402 based on the length information 403 included in the pocket for communication 401.

Therefore, according to an exemplary embodiment, the network camera 101 may reduce the amount of image transmission even without increasing a compression rate of an image, and thus, may be able to reduce an image transmission time by transmitting the data packets DP1 to DP23 including the payload 402 without the header 302H depending on a case.

Also, since the network camera 101 transmits a multi-data packet MDP including a plurality of data packets to the gateway 102, an acknowledgment response procedure from the gateway 102 is reduced, and thus, an image transmission time may be reduced. Consequently, a desired image transmission target specification may be accomplished by improving a wireless protocol.

Therefore, according to a surveillance system in accordance with exemplary embodiments, since the network camera 101 may reduce an image transmission time even without relatively increasing an image compression rate, a battery life of the network camera may be relatively extended.

The exemplary embodiments may be embodied in the form of computer programs executable through various components on a computer, and the computer program may be recorded on a non-transitory computer-readable recording medium. In this case, examples of the non-transitory computer-readable recording medium include magnetic recording media such as hard disks, floppy disks, and magnetic tapes, optical recording media such as compact disc read-only memories (CD-ROMs) and digital versatile disks (DVDs), magneto-optical recording media such as floptical disks, and hardware devices such as ROMs, random-access memories (RAMs), and flash memories that are especially configured to store and execute program commands. Furthermore, the non-transitory computer-readable recording medium may include an intangible medium embodied in a transmittable form on a network, and may be, for example, a medium embodied in the form of software or an application and transmittable and distributable via a network.

Meanwhile, the computer programs may be those that are especially designed and configured for the inventive concept, or may be those that are known and available to computer programmers skilled in the art. Examples of the computer programs include machine language codes that may be generated by a compiler, and high-level language codes that may be executed by a computer by using an interpreter.

Though the inventive concept has been described with reference to exemplary embodiments illustrated in the drawings, these are provided for an exemplary purpose only, and those of ordinary skill in the art will understand that various modifications and other equivalent embodiments may be made therein. Therefore, the spirit and scope of the inventive concept should be defined by the following claims.

What is claimed is:

1. A network camera comprising:
at least one processor configured to implement a packet generator which generates a plurality of data packets, each data packet comprising at least one of image data and audio data, and constitute a multi-data packet comprising the data packets;
a memory configured to store at least a portion of the data packets; and
an input/output (I/O) interface through which the packet generator transmits the multi-data packet to a gateway or a client device,
wherein, in response to receiving an indication that a transmission error has occurred to at least one data packet among the data packets constituting the multi-data packet, the packet generator further generates a target data packet comprising the data packet from the stored data packets, and transmits the target data packet to the gateway or the client device,
wherein the client device or the gateway sets an operation condition of the network camera, and the operation condition comprises at least one of a resolution of an image to be transmitted by the network camera, a condition of image compression performed by the network camera, a kind or type of the image to be transmitted by the network camera, and a transmission condition,
wherein the packet generator differently constitutes at least one of the data packets according to whether the operation condition is changed by the gateway or the client device,
wherein in response to determining that each operation condition is not changed, the packet generator generates the data packets such that each of the data packets comprises a pocket for communication comprising length information of a corresponding data packet, and a payload not having a header, and in response to determining that the operation condition is changed, the packet generator generates the data packets such that at least one of the data packets comprises a payload having a header, and
wherein the header comprises information required to restore the at least one of the image data and the audio data.

2. The network camera of claim 1, wherein the packet generator allocates an identifier (ID) to each of the data packets.

3. The network camera of claim 1, wherein the packet generator receives, from the gateway or the client device, an acknowledgment response comprising an identifier (ID) of the data packet to which the transmission error has occurred, and generates the target data packet comprising the data packet by using the ID.

4. The network camera of claim 3, wherein the acknowledgment response indicates the ID of the data packet to which the transmission error has occurred by adding an error flag.

5. The network camera of claim 1, wherein the payload comprises the at least one of the image data and the audio data which is compressed, and the header comprises information about compressing the at least one of the image data and the audio data.

6. A surveillance system comprising:
the network camera of claim 1; and
the gateway of claim 1 configured to check whether the transmission error has occurred to the data packet, transmits an identifier (ID) of the data packet, to which the transmission error has occurred, to the I/O interface to control the packet generator to generate a target data packet comprising the data packet from the data packets for transmission to the gateway, and transmits an operation condition set by the client device or the gateway to the network camera to control the packet generator to differently constitute at least one of the data packets according to whether the operation condition is changed by the client device or the gateway,
wherein the operation condition comprises at least one of a resolution of an image to be transmitted by the network camera, a condition of image compression performed by the network camera, a kind or type of the image to be transmitted by the network camera, and a transmission condition.

7. The surveillance system of claim 6, wherein the payload comprises the at least one of the image data and the audio data which is compressed, and the header comprises information about compressing the at least one of the image data and the audio data.

8. The surveillance system of claim 6, wherein in response to determining that the operation condition is not changed, the gateway obtains a length of the payload not having the header by using the length information included in the pocket for communication, and obtains a length of the at least one of the image data or the audio data transmitted by the network camera by summing lengths of payloads not having the header, included in each of the data packets.

9. The surveillance system of claim 6, wherein the gateway is further configured to check the transmission error by using a cyclic redundancy check code of each of the of data packets included in the multi-data packet.

10. A method of driving a network camera in a surveillance system, the method comprising:
generating, at the network camera, a plurality of data packets, each data packet comprising at least one of image data and audio data;
constituting, at the network camera, a multi-data packet comprising the data packets;
storing at least a portion of the data packets;
transmitting the multi-data packet to a gateway or a client device; and
in response to receiving an indication that a transmission error has occurred to at least one data packet among the data packets constituting the multi-data packet, generating a target data packet comprising the data packet from the stored data packets, and transmitting the target data packet to the gateway or the client device,
wherein the method further comprises setting, at the gateway or the client device, an operation condition of the network camera and transmitting the operation condition to the network camera,
wherein the operation condition comprises at least one of a resolution of an image to be transmitted by the network camera, a condition of image compression performed by the network camera, a kind or type of the image to be transmitted by the network camera, and a transmission condition, wherein the generating the data packets comprises differently constituting at least one of the data packets according to whether the operation condition is changed by the gateway or the client device, wherein the generating the data packets comprises:

in response to determining that the operation condition is not changed, generating the data packets such that each of the data packets comprises a pocket for communication comprising length information of a corresponding data packet, and a payload not having a header; and in response to determining that the operation condition is changed, generating the data packets such that at least one of the data packets comprises a payload having the header which comprises information required to restore the at least one of the image data and the audio data at the client device or the gateway, wherein the header comprises information required to restore the at least one of the image data and the audio data.

11. The method of claim 10, further comprising allocating an identifier (ID) to each of the data packets.

12. The method of claim 10, further comprising receiving, at the network camera, from the gateway or the client device, an acknowledgment response comprising an identifier (ID) of the data packet to which the transmission error has occurred, to perform the generating the target data packet comprising the data packet by using the ID.

13. The method of claim 11, wherein the acknowledgment response indicates the ID of the data packet to which the transmission error has occurred by adding an error flag.

14. The method of claim 10, wherein the payload comprises the at least one of the image data and the audio data which is compressed, and the header comprises information about compressing the at least one of the image data and the audio data.

* * * * *